No. 797,402. PATENTED AUG. 15, 1905.
C. W. CASE, Jr. & T. E. CASE.
REVERSIBLE TRANSMISSION GEARING.
APPLICATION FILED SEPT. 14, 1904.
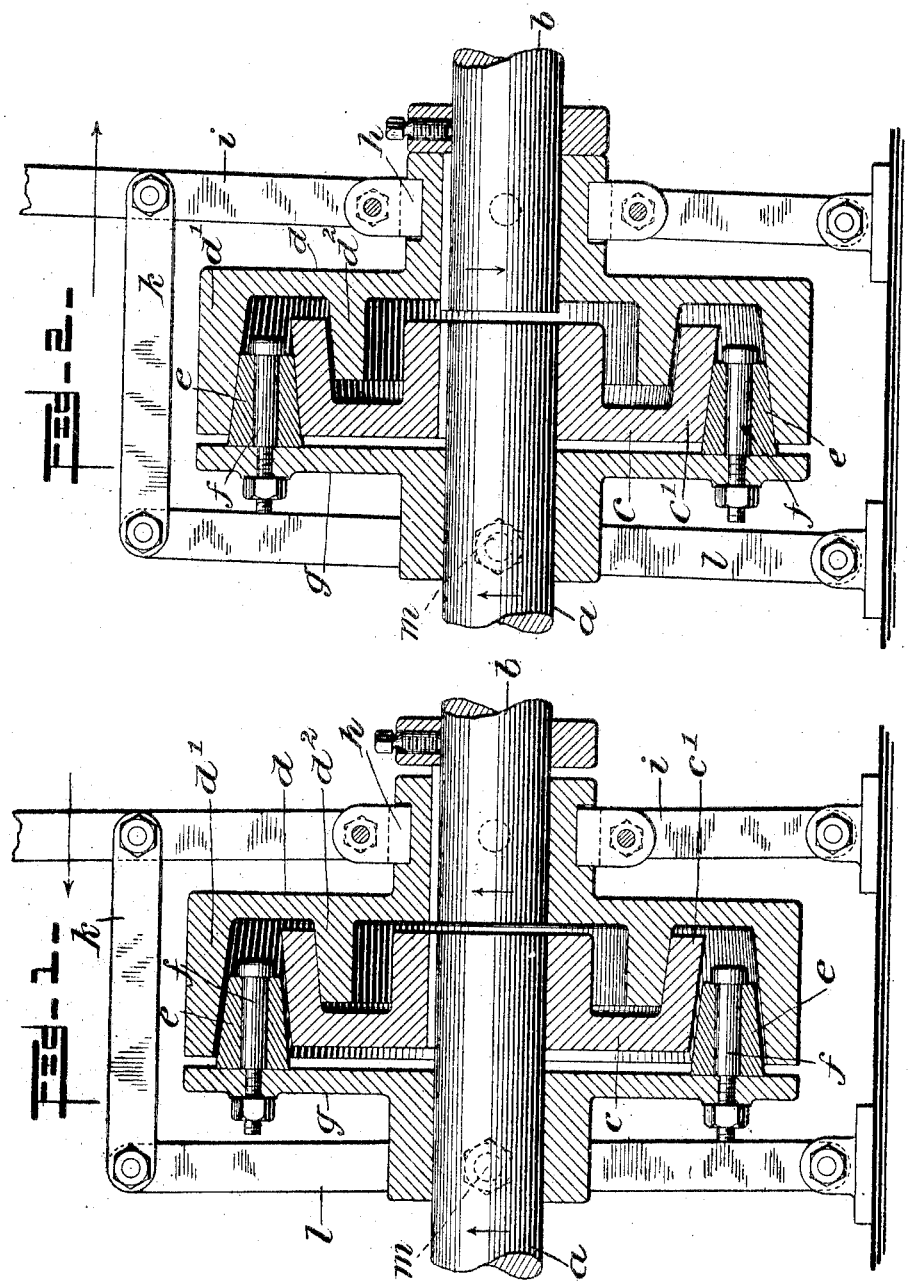
WITNESSES:
A. C. Abbott
Isaac B. Owens.
INVENTORS
Charles W. Case Jr.
Theodore E. Case
BY
ATTORNEYS

UNITED STATES PATENT OFFICE.

CHARLES WALTER CASE, JR., AND THEODORE ELLIOTT CASE, OF NEW ORLEANS, LOUISIANA.

REVERSIBLE TRANSMISSION-GEARING.

No. 797,402.          Specification of Letters Patent.          Patented Aug. 15, 1905.

Application filed September 14, 1904. Serial No. 224,411.

*To all whom it may concern:*

Be it known that we, CHARLES WALTER CASE, Jr., and THEODORE ELLIOTT CASE, citizens of the United States, and residents of New Orleans, in the parish of Orleans and State of Louisiana, have invented a new and Improved Reversible Transmission-Gearing, of which the following is a full, clear, and exact description.

The invention relates to a means for transmitting rotary movement in either direction, and in its preferred embodiment the apparatus comprises clutch-faces acting directly to connect the two shafts or other parts and friction-gears and an intermediate pinion serving to connect the two parts to turn them in the opposite direction, the said clutch and gears having a peculiar arrangement whereby upon shifting the device the clutch and gears go alternately in and out of action.

Reference is had to the accompanying drawings, which illustrate as an example the preferred embodiment of our invention, in which drawings like letters of reference indicate like parts throughout the views, and in which—

Figure 1 is a sectional view of the device, showing it driving ahead; and Fig. 2 is a similar view, except that the direction of movement is reversed.

$a$, for example, may be taken to indicate the driving shaft or member, and $b$ the driven shaft or member. Keyed to the shaft $a$ is a disk $c$, forming a gear member, said disk having a peripheral rim $c'$, the inner face of which constitutes a clutch-surface and the outer face of which constitutes a frictional-gear surface, as will hereinafter fully appear. Splined on the shaft $b$ is a disk $d$, which has two concentric flanges $d'$ and $d^2$, the latter coacting with the friction-clutch face on the inner surface of the flange $c'$ and the former opposing the friction-gear surface of said rim $c'$ and forming itself a friction-gear. Coacting between said friction-gear surfaces on the flanges $d'$ and $c'$ are friction-pinions or intermediate gears $e$, mounted loosely on studs $f$, carried by a disk $g$, loose on the shaft $a$. Connected to the disk $d$, through the medium of a collar $h$, engaged with the grooved hub of said disk, is a lever $i$, which is fulcrumed at its lower end and joined by a link $k$ with a lever $l$, which is fulcrumed at its lower end and is pivotally connected by a pin $m$ or its equivalent with the hub of the disk $g$. By throwing the lever $i$ in the direction of the arrow applied thereto in Fig. 1 the disk $d$ will be moved to engage its flange $d^2$ within the flange $c'$ of the disk $c$, and the two members $a$ and $b$ will then be coupled directly together, said members turning in unison, as indicated by the arrows applied thereto in Fig. 1. By throwing the lever $i$ in the opposite direction, as indicated by the arrow applied thereto in Fig. 2, the disk $d$ will be moved to disengage its flange $d^2$ from the flange $c'$ and simultaneously to shift the disk $g$, throwing the intermediate friction-pinions $e$ into engagement with the inner surface of the flange $d'$ and the outer surface of the flange $c'$, whereupon the movement of the shaft $a$ will be transmitted reversely and at the lower speed to the shaft $b$. By moving the lever $i$ to the position intermediate the position shown in Figs. 1 and 2 two shaft sections or members $a$ and $b$ will be held disconnected and no movement will be transmitted.

It therefore will appear that an extremely simple and durable device is provided for transmitting rotary movement in either direction or for cutting out the transmission entirely.

The invention is particularly adapted for use in small marine work where a serviceable and durable clutch at a small cost is a great desideratum, but is useful in many other connections, as will be apparent to skilled mechanics, and they will not, therefore, require special enumeration here.

Various changes in the form, proportions, and minor details of our invention may be resorted to at will without departing from the spirit and scope thereof. Hence we consider ourselves entitled to all such variations as may lie within the terms of our claims.

Having thus described our invention, we claim as new and desire to secure by Letters Patent—

1. In a transmission-gearing, the combination of two gear members, one being movable toward and from the other for the purpose specified, a lever in connection with said gear member, an intermediate gear adapted to bear between the gear members when said members are disengaged, a mount for the intermediate gear, a lever in connection with the mount, and a connection between the two levers to cause them to operate simultaneously.

2. In a transmission-gearing, the combination of two gear members relatively shiftable to engage and disengage each other, one of said gear members having a peripheral flange, and the other of said gear members having a peripheral flange and a second flange located inward thereof, the second flange of the second gear member being adapted directly to engage the flange of the first gear member, a lever in connection with the shiftable gear member, an intermediate gear member adapted to bear between the peripheral flanges of the first-named gear members, a movable mount for the intermediate gear member, a lever in connection with said mount, and a connection between the two levers to cause them to operate simultaneously.

3. The combination of two shaft-sections, a disk keyed to one and having a peripheral flange, a disk splined on the other and having two concentric flanges, the inner flange being adapted to engage with the flange of the first disk, a lever in connection with the second or splined disk to shift the same, an intermediate gear adapted to bear between the peripheral flange of the first disk and the outer flange of the second disk, a mount for the intermediate gear, said mount being carried loosely on the shaft-section bearing of the first-named disk, a lever in connection with the mount, and a connection between the two levers.

4. In a transmission-gearing, the combination of two gear members, one of which is movable toward and from the other to engage said members with each other, an intermediate gear, a movable mount for the intermediate gear whereby the intermediate gear may be engaged with or disengaged from the two gear members, a lever in connection with the shiftable gear member, a lever in connection with the intermediate gear-mount, and a connection between the two levers to move them simultaneously.

In testimony whereof we have signed our names to this specification in the presence of two subscribing witnesses.

CHARLES WALTER CASE, Jr.
  THEODORE ELLIOTT CASE.

Witnesses:
 F. T. DAUNEZ,
 JNO. LEGIER, Jr.